Nov. 3, 1970  J. W. FIDLER  3,537,898

METHOD FOR UNCLOGGING CONDUITS

Filed March 20, 1969

United States Patent Office 3,537,898
Patented Nov. 3, 1970

3,537,898
METHOD FOR UNCLOGGING CONDUITS
Jay W. Fidler, Port Chester, N.Y., assignor to Hercules Chemical Co., Inc., New York, N.Y., a corporation of New York
Filed Mar. 20, 1969, Ser. No. 808,917
Int. Cl. B08b 9/00
U.S. Cl. 134—22          10 Claims

ABSTRACT OF THE DISCLOSURE

An article and method for unclogging conduits such as drains, pipes, and the like. First, aluminum dross is charged into the conduit by being dropped onto the interior clogged area of the conduit, and thereafter a caustic solution, as for example a sodium hydroxide solution or a potassium hydroxide solution or a mixture of solutions thereof, is charged into the conduit by being dropped onto this interior clogged area of the conduit. The resulting reaction between the aluminum dross and caustic solution is exothermic and serves very effectively by the heat development to soften and/or dissolve the fatty or other matter, thereby unclogging the conduit. An oxidizer may if desired be incorporated as a powder or solution with respectively the dross or caustic solution for reacting with hydrogen as released when the dross and caustic are intermixed thereby minimizing a flammable hazard. The materials are successively applied in a single treatment from a package which includes at least a pair of units which are to be used in sequence, with one of the pairs of units comprising the aluminum dross and the other the caustic solution such as above mentioned.

BACKGROUND OF THE INVENTION

The invention relates to the unclogging of conduits such as drains or other pipes.

Such conduits will from time to time become clogged with greasy, fatty substances or like materials capable of being softened or dissolved by heat, and it has long been known to attempt to unclog such conduits with the use of materials which provide an exothermic reaction so that the generated heat will cause the solidified fatty or like clogging material to assume a softened or liquid condition enabling the conduit to become unclogged have been ineffective in that either an excessive heat or insufficient heat was developed.

There are known (a) dry mixtures of materials including caustic soda and aluminum (and oxidizers) which are applied to clogged areas of a conduit and which react upon addition of water thereto in order to achieve an exothermic reaction, and as well (b) it is known to use caustic soda solutions per se for this purpose.

When use is made of known dry mixtures of the (a) aluminum-caustic type, and the same is dropped onto the clogged area, water is added and intense exothermic reaction takes place developing heat far in excess of what is actually required for softening or dissolving the fatty or like clogging material. As a result, boiling, sputtering, and upward surging of undissolved particles of the applied dry mixture and the softened or partially dissolved particles of the clogging matter occurs. Thus, a careless user of such materials will easily be burned or otherwise injured.

On the other hand, as to the (b) caustic solutions these are generally in the form of a 26 percent sodium hydroxide solution or a mixture of sodium and potassium hydroxide in solution. Experience has shown that such solutions are seldom effective in unclogging a drain, unless a substantial quantity of caustic solution is utilized and even then with the use of such caustic solutions only a relatively semi-solid soapy body or partially dissolved waste is formed in the clogged area of the drain without producing effective unclogging of the conduit.

SUMMARY OF THE INVENTION

It is accordingly a primary object of the current invention to avoid the above drawbacks of the presently known expedients for solving the problem.

Thus, it is an object of the invention to provide a method and article capable of unclogging conduits in a very effective manner while at the same time greatly minimizing and actually eliminating the undesired effects (above referred to) of the high temperature and heat developed at the clogged zone of the conduit when (a) the dry mixture is applied to and more effectively unclogs the drain then when the (b) caustic solution above referred to is applied.

Also, it is an object of the present invention to provide an article and method which are extremely inexpensive so that the article and method of the invention can be made readily available to everyone.

The present invention is based upon the surprising discovery that by first charging aluminum dross into the drain by dropping the same onto the surface of the interior clogged area of the conduit and then secondly charging a caustic solution by pouring the same into the drain onto the surface of the clogged area, both the dross and the caustic solution will pass through the water in the drain above the clogged area and thereafter react exothermically with each other at the clogged area. Thus it is possible with complete safety to generate, in the exothermic reaction, sufficient heat to unclog the conduit in a highly reliable manner.

BRIEF DESCRIPTION OF THE DRAWINGS

The invention is illustrated in the accompanying drawings which form part of this application and in which.

DESCRIPTION OF THE PREFERRED EMBODIMENTS

Figure 1:
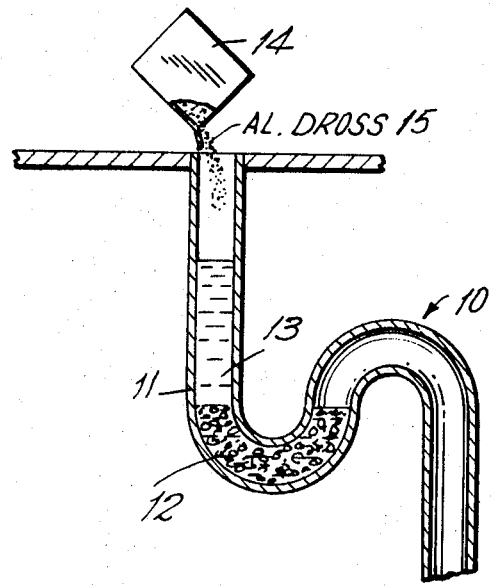
FIG. 1 is a schematic illustration of the first step of the method of the invention according to which aluminum dross is charged by being dropped onto the surface of the clogged area of a drain.

According to the method of the present invention a given quantity of aluminum dross as later specified will first be charged by dropping onto the interior clogged area 12 of the drain 11 of a conduit 10 as schematically indicated in FIG. 1. The clogged area 12, schematically represented in FIG. 1 is situated in the vicinity of the "U" sloped trap portion of the drain 11 and usually as at zone 13 of the drain, a few to several inches of water (blocked from passage through the drain) is present above the clogged area 12.

In a suitable moisture-proof pouch 14, made of a plastic material which will not react with the aluminum dross, there is charged a given quantity of aluminum dross 15 which is poured by being dropped into the drain 11, the same passing through the blocked water 13 by virtue of its higher density so as to reach the upper surface of the fatty or like obstruction at the clogged area 12 thereof in the manner indicated in FIG. 1.

The next step of the method of the invention is to charge the caustic solution 18 as for example of sodium hydroxide or potassium hydroxide or a mixture of the two, which is poured by being dropped into the drain and onto the clogged area 12, by virtue of its greater density than the water in zone 13, and will pass therethrough onto the clogged area 12 where the exothermic reaction between the aluminum dross 15 and the caustic solution 18 will be initiated at the upper surface of the clogging area 12 for the development of the requisite heat effect to soften and dissolve the clogging media comprising solidified fats and other material forming the clogged area 12 of the conduit 10.

The caustic solution 18 is initially carried in a suitable plastic bottle 19 or other enclosure made of a material which is inert with respect to the caustic solution and which is closed by a suitable removable cap 20 in which the packaged aluminum dross 14 is carried.

The bottle 19 has an externally threaded upstanding neck 21 which cooperates with the internally threaded sleeve 22 depending from the cap 20 with the upper surface of the sleeving being sealed by the base 23 of the cap, so that the cap 20 when applied to the bottle 19 serves as a closure therefor.

The cap at its upper surface has a hinged or slidable cover 24 so that at least a single but generally a plurality of aluminum dross pouches 14 may be carried therein. The bottle 19 may have a marking line or lines 25 spaced one from the other for indicating the approximate amount of caustic solution to be charged into the conduit for the respective pouches 14. Thus a single package may incorporate a plurality of pouches 14 (unit of aluminum dross) in the cap 20 and the bottle 19 may incorporate an equal number of charges (units) of the caustic solution.

Figure 2:
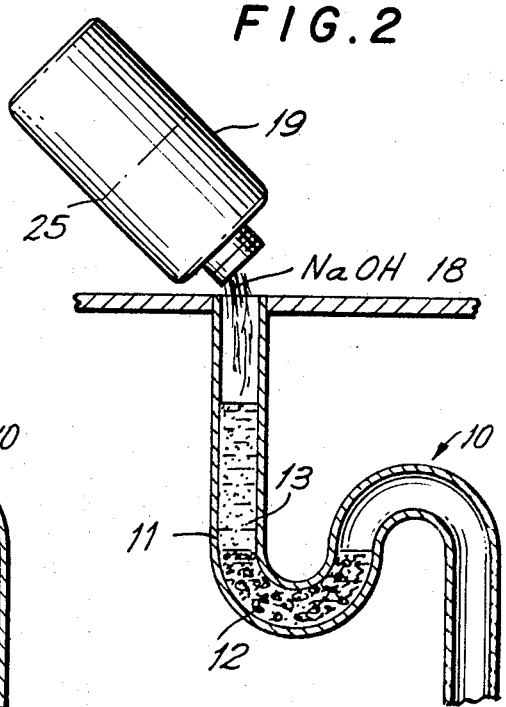
FIG. 2 shows the second step according to which a caustic solution is then charged onto the surface of the clogged area of the drain.

In use, after aluminum dross 14 has been applied to the clogged area 12 in the manner indicated in FIG. 1, the cap 20 is removed and the caustic solution is poured into the drain 11 in the manner indicated in FIG. 2.

The article 24 of the invention includes a means to indicate the sequence of use, and in the illustrated example this means includes an outer surface cap 20 carrying a pouch or pouches 14 bearing the legend "USE FIRST" and an outer surface of the bottle 19 bearing the legend "USE SECOND."

As has already been indicated above, the use of conventional caustic solutions alone, presently available in a number of commercially sold products, does not result in an exothermic reaction generating heat sufficient to achieve the desired results. Thus, with all of the various available caustic soda solutions which were tested, even after a period of 10 minutes it was never possible to provide from the exothermic reaction a temperature greater than slightly above 80° F., while as indicated the dry material mixtures of aluminum powder and caustic with or without oxidizers such as a nitrate, attained temperatures of such high range as to cause undesirable effects and problems heretofore described.

In order to compare the present invention with such conventional methods, various tests were carried out during which aluminum dross was added just prior to the addition of the liquid caustic solution (26 percent caustic soda). The dross was present in an amount of approximately 7 percent, so that based on this latter percentage there was approximately 10 grams of dross for each pint of 26 percent caustic soda solution. For the sake of comparison, tests were also conducted with 15 grams and 20 grams of dross per pint of caustic soda solution.

The results of these tests are indicated in Table 1, which follows:

TABLE 1

| Time (minutes) | Temperature rise (° F.) | | |
|---|---|---|---|
| | 10 g. dross | 15 g. dross | 20 g. dross |
| 0 | 74 | 76 | 74 |
| 1 | 86 | 98 | 90 |
| 2 | 88 | 102 | 96 |
| 3 | 90 | 106 | 100 |
| 4 | 90 | 112 | 106 |
| 5 | 92 | 116 | 110 |
| 6 | 94 | 126 | 118 |
| 7 | 94 | 132 | 126 |
| 8 | 96 | 138 | 138 |
| 9 | 98 | 142 | 146 |
| 10 | 100 | 143 | 154 |
| 11 | 100 | 144 | 158 |
| 12 | 102 | 142 | 160 |
| 13 | 104 | 142 | 162 |
| 14 | 104 | 140 | 160 |
| 15 | 106 | 139 | 158 |
| 16 | 108 | 138 | 158 |
| 17 | 110 | 136 | 156 |
| 18 | 108 | 134 | 154 |
| 19 | 108 | 132 | 154 |
| 20 | 106 | 132 | 153 |
| Percent fat removed | | | |
| | 75 | 93 | 95 |

As is apparent from the above Table 1, a very effective unclogging is achieved when using 10 grams of dross per pint of caustic solution or 15 grams of dross per pint of caustic soda solution. While 20 grams of dross can also be used, as indicated in the last column of the table, the temperature reaches an elevation which is somewhat higher than desired so that the small increase in percentage of fat removed does not justify the use of the higher temperatures resulting from the larger amount of dross. It is therefore preferred to carry out the invention either with 10 grams of dross or 15 grams of dross per pint of caustic soda solution.

A 26 percent caustic sodium hydroxide solution is prepared either by diluting commercial 50 percent or by diluting commercial 73 percent caustic soda solution according to the following Formulas A and B, respectively:

FORMULA A

| | Percent by weight | Pounds per 110 gallons |
|---|---|---|
| Water | 48 | 504.0 |
| Liquid caustic soda (50 percent grade) | 52 | 546.0 |
| Total | 100 | 1,050.0 |

FORMULA B

| | | |
|---|---|---|
| Water | 64.4 | 676.2 |
| Liquid caustic soda (73 percent grade) | 35.6 | 373.8 |
| Total | 100.0 | 1,050.0 |

Actually it is preferred to prepare the 26% caustic solution from the 50 percent commercial caustic soda solution or medium thereof with potassium hydroxide because of inconveniences in handling the 73 percent caustic soda solution or mediums thereof with potassium hydroxide, these inconveniences resulting in an increase in cost beyond that encountered by the raw material and freight cost. Thus, the unloading and handling of the 73 percent caustic sofa requires more attention and equipment than the unloading and handling of the 50 percent liquid caustic soda which can be unloaded and handled in a relatively simple manner.

The aluminum dross is in the form of a finely divided powder which is quite inexpensive and easily handled. An analysis of a sample of a preferred composition of aluminum dross used with the invention is of the range as follows:

SPECTOGRAPHIC ANALYSIS

| | Percent |
|---|---|
| Aluminum | 1–100 |
| Magnesium | 1–10 |
| Silicon, iron | 1–1 |
| Manganese, copper, gallium | .01–1 |
| Titanium, nickel, vanadium, boron, lead, calcium | .001–01 |
| Chromium | .0001–001 |

QUANTITATIVE ANALYSIS

| | Percent |
|---|---|
| Aluminum as metal | 69.9 |
| Aluminum oxide content | 15.3 |
| Magnesium as metal | 0.28 |
| Magnesium oxide content | 1.30 |
| Insoluble residue | 11.2 |

In the above analysis the insoluble residue was not identified. However, it is not volatized by HF or dissolved by carbonate fusion and therefore the material is not a silica or silicate. Of course, the dross is not compositionally uniform and therefore values obtainable differ somewhat from one sample to the next.

There is at least a potential disadvantage to the use of the aluminum dross followed by the application of the liquid caustic in accordance with the invention, in that hydrogen will be evolved during normal use of the materials. While it is doubtful that sufficient quantities of this gas could evolve in order to pose any flammability hazard, it is preferred to avoid this problem. Thus, it is preferred to use the above materials in the presence of sodium nitrate which would react with hydrogen to form ammonia and water. While the sodium nitrate could be in dry form and mixed with the aluminum dross it is preferred to dissolve the sodium nitrate in the caustic solution.

After experimenting with different proportions of sodium nitrate in the solution it was found that when 8.5 percent sodium nitrate is included in the caustic solution not only is the desired effect with respect to the hydrogen achieved, but also the ingredients can be stored without any crystals developing even at temperatures as low as −20° F.

Thus, the preferred composition for the caustic solution of the invention is as follows (including the oxidizing agent sodium nitrate), it being pointed out that in lieu of sodium hydroxide, potassium hydroxide may be utilized, or a mixture of sodium and potassium hydroxide in 50% solution:

FORMULA C

| | Percent by weight | Pounds per 100 gallons |
|---|---|---|
| Sodium hydroxide solution, 50 percent | 52.0 | [1] 585.5 |
| Sodium nitrate, technical grade | 8.5 | 95.7 |
| Water | 39.5 | [2] 444.8 |
| Total | 100.0 | [3] 1,126.0 |

[1] 45.9 gallons.  [2] 53.4 gallons.  [3] 100 gallons.

It is also to be noted that in addition to using aluminum dross, aluminum nuggets of relatively pure aluminum, pouches of higher content aluminum, turnings and granules were all tested, but none of them were capable of achieving the desired results as effectively as aluminum dross, so that this latter form of the aluminum is preferred. The outstanding results achieved with the aluminum dross very likely results not only from the very large exposed surface area of the particles, but also from the fact that they are heavy enough so as to remain below the entrapped water 13, and act upon the surface and as heat is developed by the exothermic reaction act by contact with the greasy, fatty and like substances, which are heated to the softening or dissolution stage so as to unclog the areas of the conduit.

Figure 3:
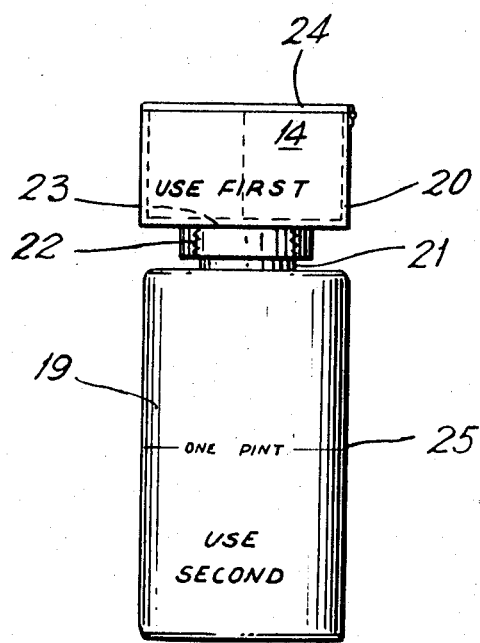
FIG. 3 is a schematic representation of a package forming an article of manufacture utilizable in accordance with the invention.

Thus the article of the invention as shown in FIG. 3 will be sold with at least one unit formed by the pouch 14 which preferably will contain 10 to 15 grams of aluminum dross while the second unit formed by the container 19 will in this case contain 1 pint of 26 percent sodium or potassium hydroxide solution or an intermixture thereof carrying in solution with the oxidizer sodium nitrate.

An article 25 of this type may be applied as a "one use" unit because in this way the moisture-proof pouch 14 need only be removed from the cap by operating the latch therefor, and then be torn open and the entire contents thereof emptied into the drain 10; then the cap 20 may be removed from the container 19 and the entire contents of the container 19 is poured into the drain, after which the empty pouch 14 and the empty container 19 can be thrown away. In this way the requirement of measuring the amounts of dross and solution is avoided and the pouch 14 and container 19 can be made of inexpensive materials which can be used once and disposed of without incurring any substantial cost.

Of course, the article 25 may incorporate a number of pouches 14 as in FIG. 3, and the container 19 may be of a size provided multiples of a single unit of caustic solution as 24A and 24B, thus providing a plural use of the mixtures of aluminum dross and caustic solution with or without the sodium nitrate.

Although reference has been had in the preferred example to the use of aluminum dross particles, it is within the province of this invention to utilize aluminum as such in particle form in lieu of aluminum dross without departing from the scope of this invention.

What is claimed is:

1. In a method for unclogging conduits in the form of drains, pipes, and the like, the steps of first pouring particles selected from the group consisting of aluminum dross and aluminum onto the clogged area in the interior of the conduit, and then pouring a caustic solution onto the clogged area in the interior of the conduit.

2. In a method as recited in claim 1 wherein a powdered oxidizing agent is intermixed with the aluminum dross.

3. In a method as recited in claim 1 wherein sodium nitrate is applied as a powder intermixed with the aluminum dross or as dissolved in the caustic solution.

4. In the method of claim 1, the utilization as the caustic solution of a member or an intermixture of members of the group consisting of sodium hydroxide and potassium hydroxide.

5. In a method as recited in claim 1 and wherein the caustic solution is a part of a 26 percent solution thereof.

6. In a method as recited in claim 5 and wherein said aluminum dross is added in a proportion of approximately 10 grams of dross for each pint of caustic hydroxide solution.

7. In a method as recited in claim 5 and wherein said aluminum dross is added in a proportion of approximately 15 grams of dross for each pint of caustic solution.

8. In a method as recited in claim 5 and wherein a soluble oxidizing agent is dissolved in with the caustic solution.

9. In a method as recited in claim 8 and wherein the caustic solution includes 8.5 percent sodium nitrate dissolved therein.

10. In the method of claim 9, the utilization as the caustic solution of a member or a mixture of members of the group consisting of sodium hydroxide and potassium hydroxide.

References Cited

UNITED STATES PATENTS

| | | | |
|---|---|---|---|
| 1,129,056 | 2/1915 | Anhaltzer | 252—157 XR |
| 1,736,440 | 11/1929 | Hall | 252—157 XR |
| 1,928,226 | 9/1933 | Ladd | 252—157 |
| 2,773,040 | 12/1956 | Walton | 252—157 |
| 2,997,444 | 8/1961 | Martin et al. | 252—156 |
| 3,077,455 | 2/1963 | Racke | 252—157 |

MORRIS O. WOLK, Primary Examiner

J. T. ZATARGA, Assistant Examiner

U.S. Cl. X.R.

134—30